United States Patent
Oikawa et al.

(10) Patent No.: US 10,282,547 B2
(45) Date of Patent: May 7, 2019

(54) DEVICE, METHOD AND STORAGE MEDIUM FOR TERMINATING OPERATION OF SOFTWARE THAT IS NOT SUCCESSFULLY VERIFIED

(71) Applicant: FUJITSU LIMITED, Kawasaki-shi, Kanagawa (JP)

(72) Inventors: Takanori Oikawa, Kawasaki (JP); Kazuyoshi Furukawa, Kawasaki (JP); Hirotaka Kokubo, Minato (JP); Mebae Yamaoka, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 15/246,878

(22) Filed: Aug. 25, 2016

(65) Prior Publication Data
US 2017/0083706 A1    Mar. 23, 2017

(30) Foreign Application Priority Data
Sep. 18, 2015 (JP) .................................. 2015-184676

(51) Int. Cl.
*G06F 21/56* (2013.01)
*H04L 29/06* (2006.01)

(52) U.S. Cl.
CPC .......... *G06F 21/566* (2013.01); *H04L 63/145* (2013.01); *H04L 63/1416* (2013.01)

(58) Field of Classification Search
CPC .. G06F 21/556; H04L 63/145; H04L 63/1416

USPC ........................................................... 726/23
See application file for complete search history.

(56) References Cited

U.S. PATENT DOCUMENTS

| | | | |
|---|---|---|---|
| 9,092,625 B1* | 7/2015 | Kashyap | G06F 21/566 |
| 2009/0288167 A1* | 11/2009 | Freericks | G06F 21/54 726/23 |
| 2011/0271342 A1* | 11/2011 | Chung | G06F 21/554 726/23 |
| 2013/0097655 A1* | 4/2013 | Vaidyanathan | G06F 21/55 726/1 |

FOREIGN PATENT DOCUMENTS

| | | |
|---|---|---|
| JP | 2004-126854 | 4/2004 |
| JP | 2008-176352 | 7/2008 |
| JP | 2011-233125 | 11/2011 |

OTHER PUBLICATIONS

Official Notification for Japanese Application No. 2015-184676 dated Aug. 21, 2018.

(Continued)

*Primary Examiner* — Teshome Hailu
(74) *Attorney, Agent, or Firm* — Staas & Halsey LLP

(57) ABSTRACT

A device includes: a memory configured to store in advance a command transmitted from malware to hardware via an operating system; and a processor coupled to the memory and configured to: hook a first command transmitted from the operating system to the hardware, and transmit information that causes the malware to determine to terminate operation of the malware to the operating system when the hooked first command corresponds with the command stored in the memory.

20 Claims, 23 Drawing Sheets

(56) References Cited

OTHER PUBLICATIONS

T. Matsuki et al.; "Proposal of Malware Activity Control Taking Advantage of Anti-Analysis Technique"; Collected Papers of Information Processing Society Symposium, Information Processing Society of Japan; vol. 2006, No. 11, pp. 299-304.

T. Matsuki et al.; "Proposal of Malware Activity Control Method Turning Anti-analysis Function to Advantage"; Journal of Collected Papers of Information Processing Society; Information Processing Society of Japan; Sep. 15, 2009; vol. 50, No. 9, pp. 2118-2126.

* cited by examiner

FIG. 21

| ITEM NUMBER | COMMAND | RETURN VALUE |
|---|---|---|
| 1 | REFERENCE TO HDD NAME | VM-AAA-HDD |
| 2 | REFERENCE TO THE NUMBER OF CPU CORES | 3 |
| 3 | REFERENCE TO DISC CAPACITY | 200(GB) |

FIG. 22

| ITEM NUMBER | COMMAND | RETURN VALUE |
|---|---|---|
| 1 | REFERENCE TO HDD NAME | VM-AAA-HDD |
| 2 | REFERENCE TO THE NUMBER OF CPU CORES | 3 |
| 3 | REFERENCE TO DISC CAPACITY | 200(GB) |
| 4 | CONFIRMATION OF EXISTENCE OF I/O-AAA | EXISTENCE |

FIG. 23

| ITEM NUMBER | ENVIRONMENT INFORMATION | CONTENTS |
|---|---|---|
| 1 | HDD NAME | VM-AAA-HDD |
| 2 | THE NUMBER OF CPU CORES | 3 |
| 3 | DISC CAPACITY | 200(GB) |
| 4 | I/O PORT | I/O-AAA, I/O-BBB |

DEVICE, METHOD AND STORAGE MEDIUM FOR TERMINATING OPERATION OF SOFTWARE THAT IS NOT SUCCESSFULLY VERIFIED

CROSS-REFERENCE TO RELATED APPLICATION

This application is based upon and claims the benefit of priority of the prior Japanese Patent Application No. 2015-184676, filed on Sep. 18, 2015, the entire contents of which are incorporated herein by reference.

FIELD

The embodiment discussed herein is related to a device, a method, and a storage medium.

BACKGROUND

A security administrator (hereinafter, referred to also simply as administrator) in a company or organization is expected to suppress fraudulent acquisition, destruction, and so forth of information (hereinafter, referred to also as malignant operation) by malware for example. The malware is a generic term of software that carries out harmful operation, including computer virus.

For example, malware is transmitted in the form of being attached to an e-mail transmitted from an external terminal device (hereinafter, referred to also simply as external terminal) by a malicious person, and is executed in a terminal device that receives the e-mail to infect the terminal device. This allows the malicious person to use the terminal device infected with the malware as a steppingstone to gain unauthorized access to other terminal devices (for example, terminal device that stores confidential information, and so forth) coupled to the terminal device and carry out fraudulent acquisition of information and so forth.

For this reason, the administrator sets a verification device (for example, device having a virtual environment implemented by a virtual machine) that executes software when the software is attached to an e-mail transmitted from an external terminal to a terminal device for example.

When software is attached to an e-mail transmitted from an external terminal to a terminal device, the verification device acquires the e-mail before the e-mail is transmitted to the terminal device. Then, the verification device executes and analyzes the software attached to the acquired e-mail on a debugger (virtual environment) of the verification device. If it is determined that the software is not malware as the result, the verification device transmits the e-mail to which the software is attached to the terminal device. On the other hand, if determining that the software is malware, the verification device discards the e-mail to which the software is attached without transmitting the e-mail to the terminal device for example. This allows the administrator to suppress infection with the malware in the terminal device.

As one example of the related art, Japanese Laid-open Patent Publication No. 2011-233125 and Japanese Laid-open Patent Publication No. 2004-126854 are known.

SUMMARY

According to an aspect of the embodiment, a device includes: a memory configured to store in advance a command transmitted from malware to hardware via an operating system; and a processor coupled to the memory and configured to: hook a first command transmitted from the operating system to the hardware, and transmit information that causes the malware to determine to terminate operation of the malware to the operating system when the hooked first command corresponds with the command stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 21, 22, and 23 are one example of policy information.

DESCRIPTION OF EMBODIMENT

Among pieces of the above-described malware, malware that terminates the operation of oneself (malware that does not carry out malignant operation) when detecting that the malware is executed on any program exists for example. Such malware determines that there is a possibility that the malware is being executed on a program (debugger) for analyzing the operation of the malware and terminates the operation in order to suppress the analysis of the operation of the malware when detecting that the malware is executed on any program (hereinafter, such a function will be referred to also as anti-analysis function).

For this reason, in some cases, the existing verification device does not detect executed malware as malware when executing malware having the anti-analysis function on a debugger of the verification device. Therefore, in this case, the verification device transmits the e-mail to which the malware is attached to a terminal device and the terminal device becomes infected with the malware attached to the e-mail transmitted from the verification device.

The embodiment discussed herein intends to suppress the operation of malware in one aspect.

[Configuration of Information Processing System]

Figure 1:
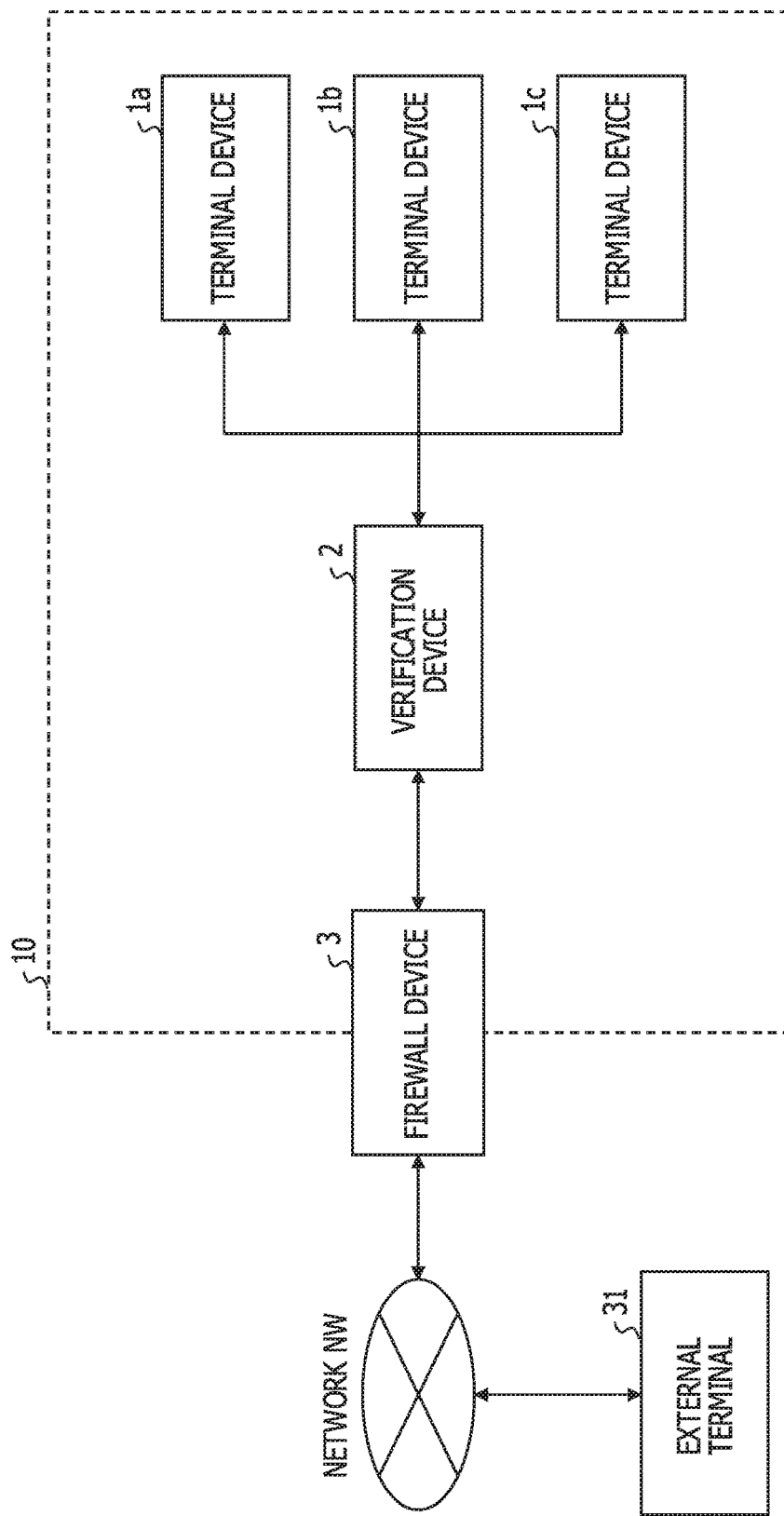
FIG. 1 is a diagram for explaining an overall configuration of an information processing system.

FIG. 1 is a diagram for explaining an overall configuration of an information processing system. An information processing system 10 illustrated in FIG. 1 includes terminal devices 1a, 1b, and is (hereinafter, the terminal devices 1a, 1b, and is will be referred to also as the terminal device 1 or the network protecting device 1 collectively), a verification device 2, and a firewall device 3.

The terminal device 1 is a terminal used by a developer or administrator of a business operations system in a company or organization. The terminal device 1 is a desktop personal computer (PC) or notebook PC for example.

The firewall device 3 controls communications between an external terminal 31 coupled to a network NW and the terminal device 1. That is, the firewall device 3 defends against unauthorized access to the terminal device 1 by the external terminal 31, and so forth, for example. The network NW is the Internet network for example.

For example, when an e-mail is transmitted from the external terminal 31 to the terminal device 1, the verification device 2 acquires the transmitted e-mail and determines whether or not software is attached to the e-mail. Then, if software is attached to the e-mail transmitted from the external terminal 31, the verification device 2 executes the software attached to the e-mail on a debugger of a verification environment constructed in the verification device 2 for example.

That is, there is a possibility that the firewall device 3 does not detect that the software attached to the e-mail is malware and permits communications. For this reason, the verification device 2 carries out the determination as to whether or not the software attached to the e-mail allowed to pass by the firewall device 3 is malware. The verification environment constructed in the verification device 2 is a virtual environment including a virtual machine (hereinafter, referred to also as VM) generated through allocation of a physical resource of the verification device 2 for example.

Then, if determining that the software is not malware as the result of the execution of the software attached to the e-mail transmitted from the external terminal 31, the verification device 2 transmits the e-mail transmitted from the external terminal 31 to the terminal device 1. On the other hand, if determining that the software attached to the e-mail transmitted from the external terminal 31 is malware, the verification device 2 discards the e-mail transmitted from the external terminal 31 without transmitting the e-mail to the terminal device 1. Due to this, even when an e-mail to which malware is attached is transmitted from the external terminal 31, the verification device 2 can keep the terminal device 1 from becoming infected with the malware transmitted from the external terminal 31.

[One Example of Processing of Verification Device]

Next, one example of processing of a verification device will be described. FIGS. 2, 3, 4, 5, and 6 are diagrams for explaining one example of processing of a verification device in the case in which an e-mail to which malware is attached is received. The verification device illustrated in FIGS. 2, 3, 4, 5, and 6 may be the verification device 2 illustrated in FIG. 1.

Figure 2:
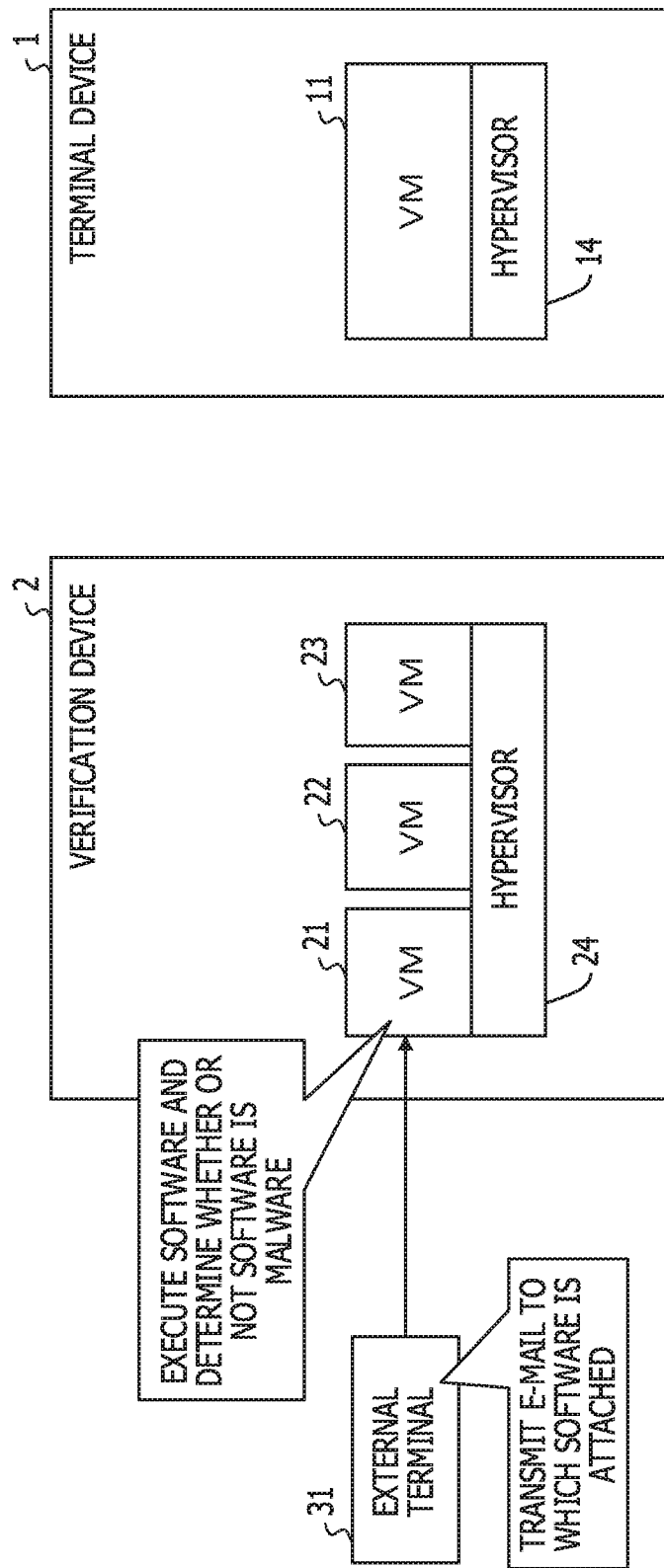
FIGS. 2, 3, 4, 5, and 6 are diagrams for explaining one example of processing of a verification device in the case in which an e-mail to which malware is attached is received.

In the example illustrated in FIG. 2, the verification device 2 is a physical machine having physical resources (central processing unit (CPU) and memory) for generating a virtual machine. In the verification device 2 illustrated in FIG. 2, virtualization software 24 (hereinafter, referred to also as the hypervisor 24) for generating or deleting a virtual machine in the verification device 2 operates. Furthermore, in the verification device 2 illustrated in FIG. 2, virtual machines 21, 22, and 23 to which physical resources of the verification device 2 are allocated are deployed.

Furthermore, in the terminal device 1 illustrated in FIG. 2, similarly to the verification device 2, virtualization software 14 (hereinafter, referred to also as the hypervisor 14) for managing generation or deletion of a virtual machine in the terminal device 1 operates. Moreover, in the terminal device 1 illustrated in FIG. 2, a virtual machine 11 to which a physical resource of the terminal device 1 is allocated is deployed.

When the external terminal 31 transmits an e-mail to the terminal device 1, the verification device 2 acquires the e-mail transmitted from the external terminal 31 before the e-mail is transmitted to the terminal device 1 as illustrated in FIG. 2. Then, the verification device 2 determines whether or not software is attached to the transmitted e-mail for example. As a result, if the software is attached, the verification device 2 executes the software on a debugger of the virtual machine 21 and carries out analysis for example. That is, the verification device 2 determines whether or not the software attached to the e-mail is malware.

Figure 3:
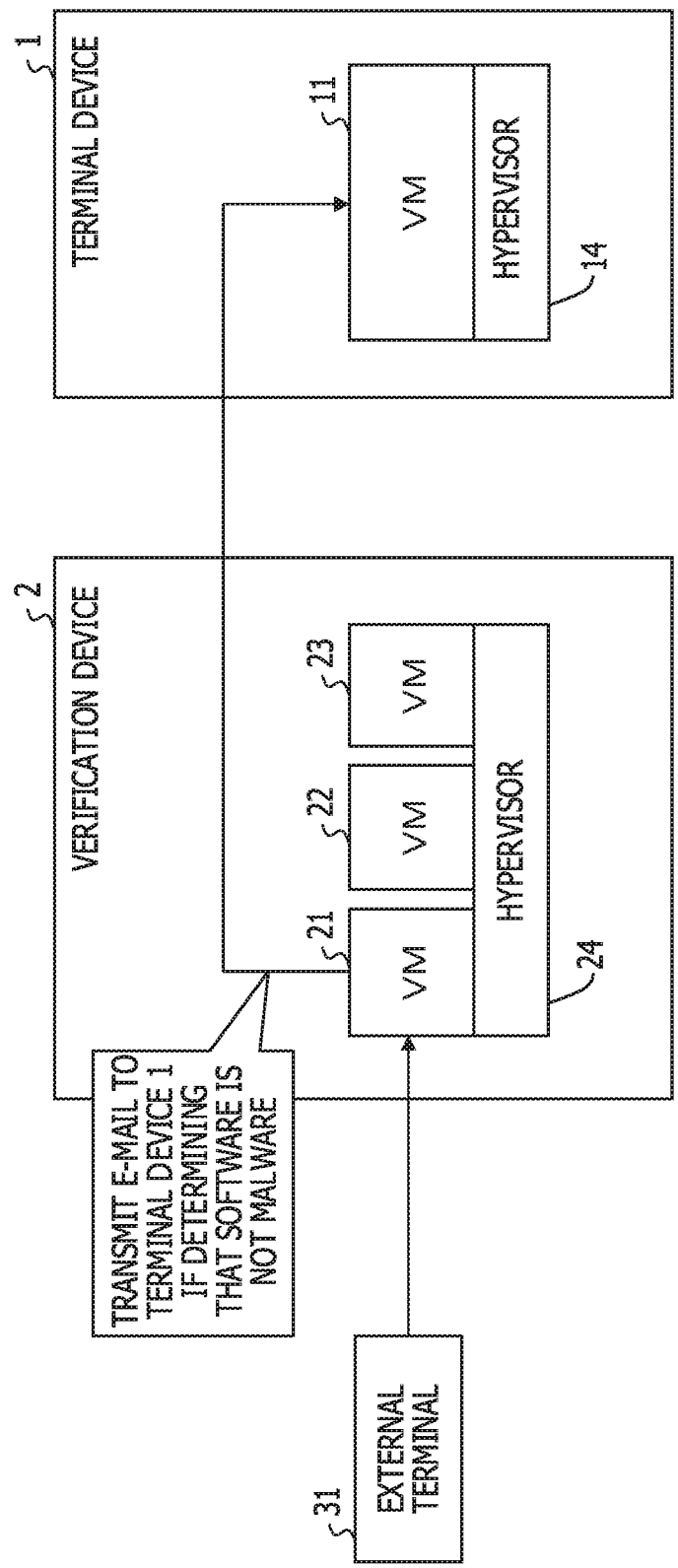

Then, if the verification device 2 determines that the software attached to the e-mail transmitted from the external terminal 31 is not malware, the virtual machine 21 transmits the e-mail transmitted from the external terminal 31 to the terminal device 1 as illustrated in FIG. 3. Furthermore, the virtual machine 21 transmits the transmitted e-mail to the terminal device 1 also when software is not attached to the e-mail transmitted from the external terminal 31 for example.

On the other hand, if the software attached to the transmitted e-mail is malware, the virtual machine 21 discards the e-mail transmitted from the external terminal 31 without transmitting the e-mail to the terminal device 1. This makes it possible to keep the terminal device 1 from becoming infected with the malware even when the software attached to the transmitted e-mail is the malware.

Figure 4:
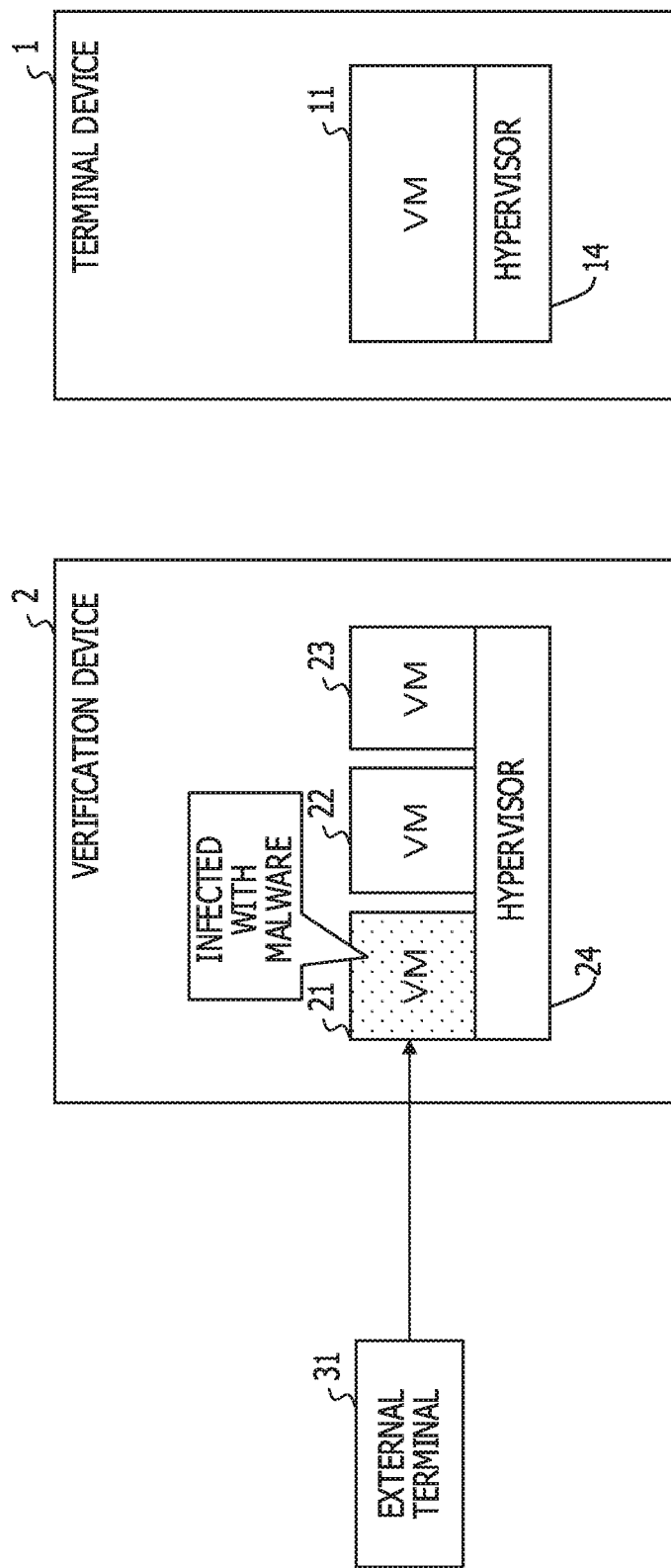
Figure 5:
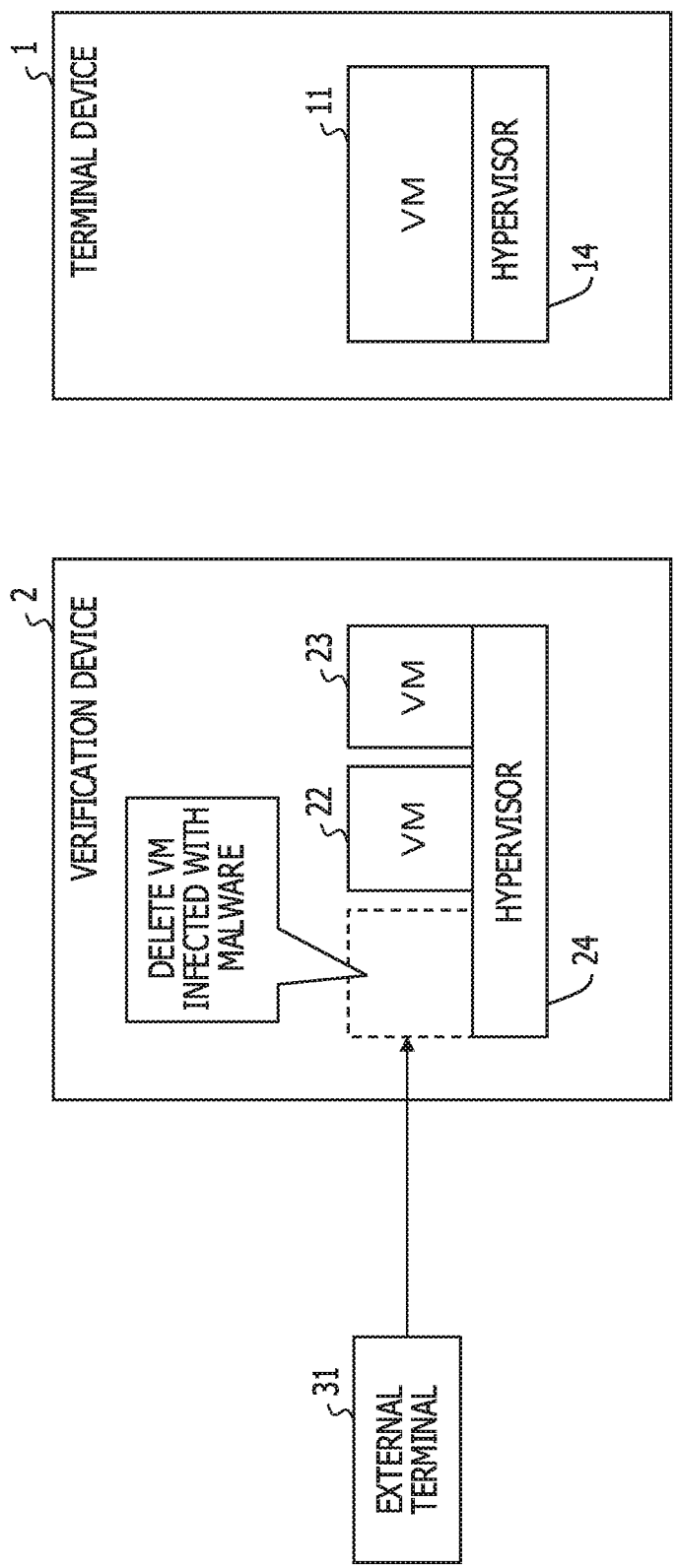

If the software attached to the transmitted e-mail is malware, possibly the virtual machine 21 becomes infected with the malware as illustrated in FIG. 4. In this case, the verification device 2 deletes the virtual machine 21 infected with the malware as illustrated in FIG. 5. This allows the verification device 2 to delete the environment infected with the malware from the verification device 2.

Figure 6:
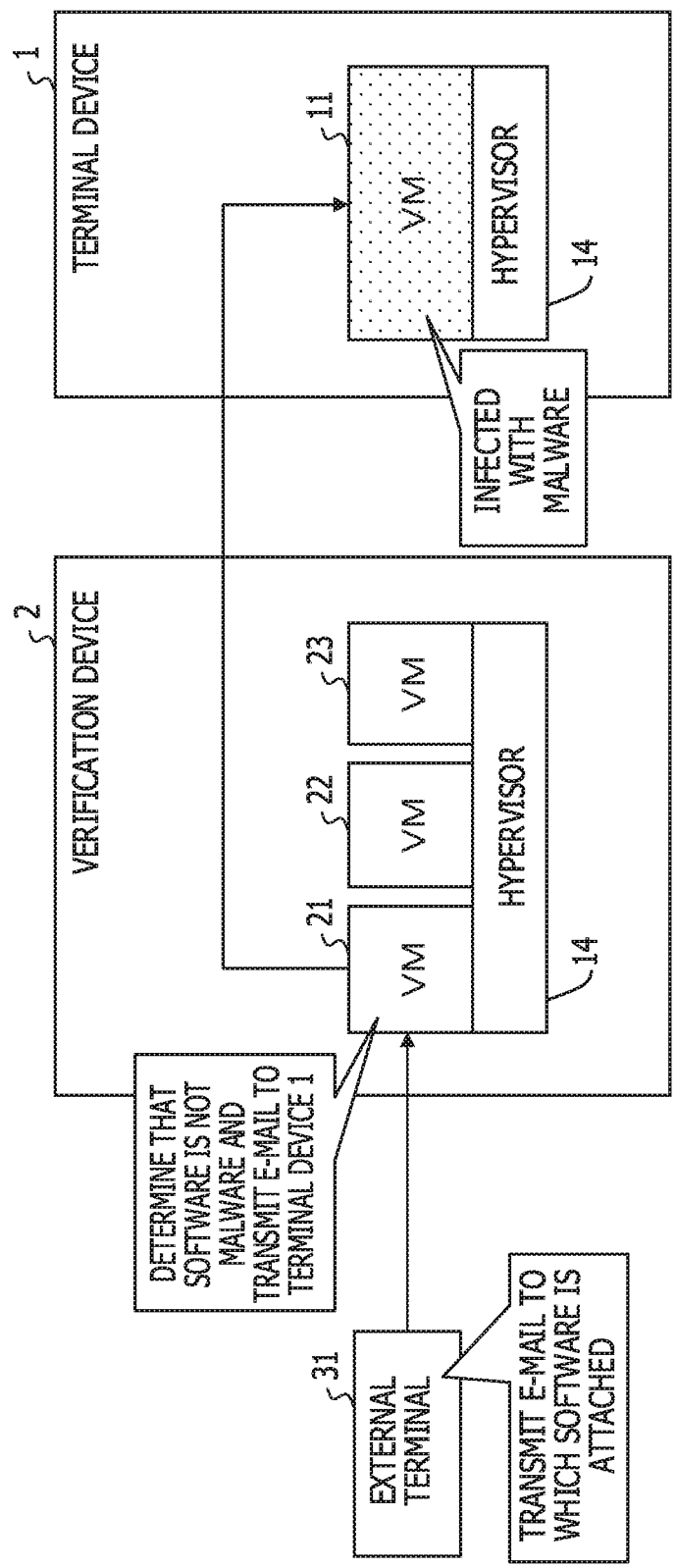

Here, among pieces of the above-described malware, malware exists that has the anti-analysis function of determining to terminate the operation of oneself (determining not to carry out malignant operation) when detecting that the malware is executed on a debugger as illustrated in FIG. 6. For this reason, when executing malware having the anti-analysis function on a debugger, the verification device 2 does not detect the executed malware as malware in some cases. Therefore, in this case, there is a possibility that the verification device 2 transmits the e-mail to which the malware is attached to the terminal device 1 and causes the terminal device 1 to become infected with the malware as illustrated in FIG. 6. In the following, a description will be made about one example of processing of the verification device 2 and the terminal device 1 for coping with the malware having the anti-analysis function.

[One Example of Processing of Verification Device Against Malware Having Anti-Analysis Function]

Figure 7:
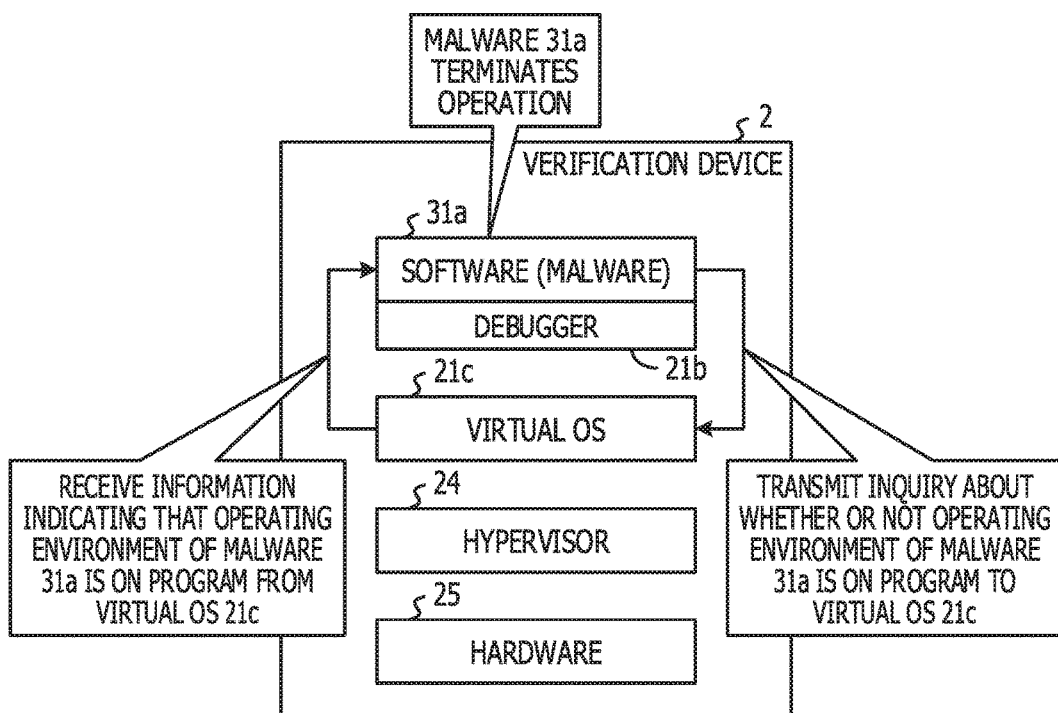
FIG. 7 is a diagram for explaining one example of processing of a verification device in the case in which malware having an anti-analysis function is received.

FIG. 7 is a diagram for explaining one example of processing of a verification device in the case in which malware having an anti-analysis function is received. The verification device illustrated in FIG. 7 may be the verification device 2 illustrated in FIG. 1. In the verification device 2 illustrated in FIG. 7, the hypervisor 24 operates on hardware 25 (physical resource) of the verification device 2 and generates or deletes the virtual machine 21. In the case of generating the virtual machine 21, the hypervisor 24 generates a virtual operating system (OS) 21c (hereinafter, referred to also as the guest OS 21c) on the hypervisor 24 and allocates part of the hardware 25 as hardware of the virtual machine 21 (hereinafter, referred to also as virtual hardware). On the other hand, in the case of deleting the virtual machine 21, the hypervisor 24 deletes the virtual OS 21c generated on the hypervisor 24 and releases the virtual hardware of the virtual machine 21.

Furthermore, in the verification device 2 illustrated in FIG. 7, a debugger 21b for executing and analyzing software 31a (software having the possibility of being malware) or the like attached to the received e-mail operates on the virtual OS 21c.

In the example illustrated in FIG. 7, the hypervisor 24 directly operates on the hardware 25. However, the hypervisor 24 may be a hypervisor that operates on a host OS (not illustrated) that operates on the hardware 25.

In the example illustrated in FIG. 7, if the software 31a executed on the verification device 2 is malware, the malware (hereinafter, referred to also as the malware 31a) determines whether or not the present environment in which the malware 31a is executed is the environment in which the malware 31a is to continue the operation (environment in which the malware 31a is to start malignant operation). In this case, the malware 31a determines whether or not the environment in which the malware 31a is executed is on any program for example. If determining that the environment in which the malware 31a is executed is on any program as the result, the malware 31a determines that the environment in which the malware 31a is executed is not the terminal device 1 as the destination of the e-mail but a verification environment on another device. Then, in this case, the malware 31a determines that the environment in which the malware 31a is executed is not the environment in which the malware 31a is to continue the operation, and terminates the operation. This allows the malware 31a to suppress the operation of oneself from being analyzed.

In the example illustrated in FIG. 7, the malware 31a transmits an inquiry about whether or not the environment in which the malware 31a is executed is on a program to the virtual OS 21c. Then, the malware 31a terminates the operation if receiving information indicating that the environment in which the malware 31a is executed is on a program from the virtual OS 21c. That is, in this case, the malware 31a determines that the present environment in which the malware 31a is executed is not the environment in which the malware 31a is to continue the operation, and does not execute operation for carrying out malignant operation.

This allows the malware 31a to cause the verification device 2 to erroneously determine that the malware 31a is not malware. Thus, in this case, the malware 31a can keep the malware 31a from being excluded by the verification device 2 and reach the terminal device 1.

[One Example of Processing of Terminal Device Against Malware Having Anti-Analysis Function]

Figure 8:
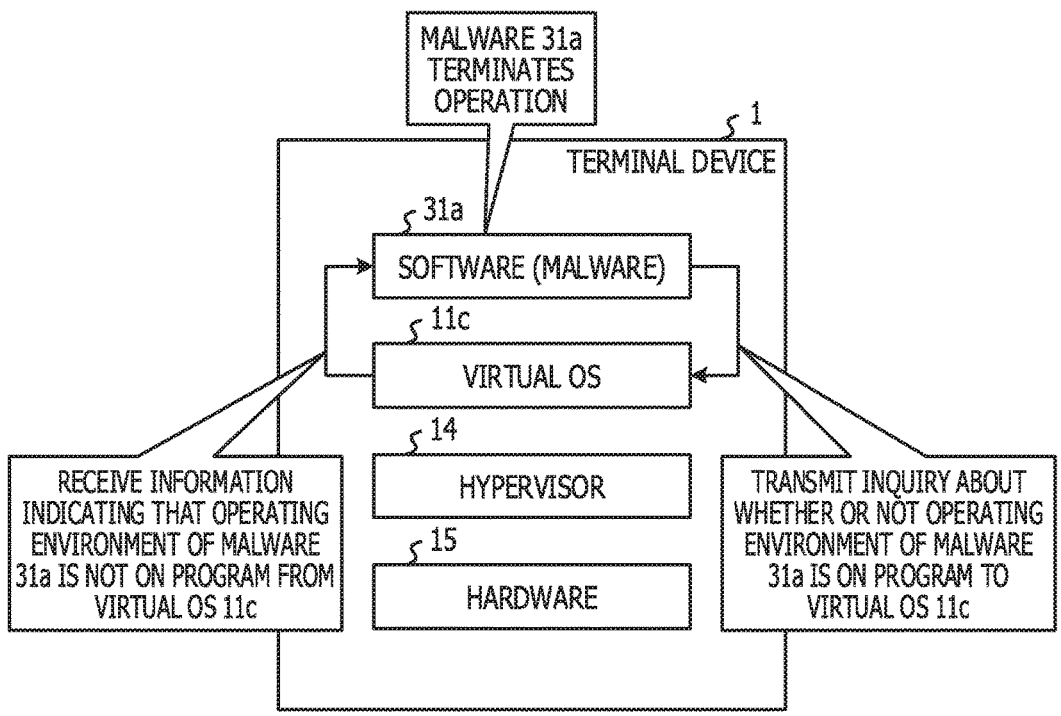
FIG. 8 is a diagram for explaining one example of processing of a terminal device in the case in which malware having an anti-analysis function is received.

Next, FIG. 8 is a diagram for explaining one example of processing of a terminal device in the case in which malware having an anti-analysis function is received. The terminal device illustrated in FIG. 8 may be the terminal device 1 illustrated in FIG. 1. In the terminal device 1 illustrated in FIG. 8, the hypervisor 14 operates on hardware 15 (physical resource) of the terminal device 1 and generates or deletes the virtual machine 11. In the case of generating the virtual machine 11, the hypervisor 14 generates a virtual OS 11c (hereinafter, referred to also as the guest OS 11c) on the hypervisor 14 and allocates part of the hardware 15 as virtual hardware of the virtual machine 11. On the other hand, in the case of deleting the virtual machine 11, the hypervisor 14 deletes the virtual OS 11c generated on the hypervisor 14 and releases the virtual hardware of the virtual machine 11.

The terminal device 1 illustrated in FIG. 8 is not a device for executing software attached to an e-mail and carrying out analysis and therefore does not include a debugger differently from the verification device 2 illustrated in FIG. 7. Furthermore, the hypervisor 14 illustrated in FIG. 8 directly operates on the hardware 15. However, the hypervisor 14 may be a hypervisor that operates on a host OS (not illustrated) that operates on the hardware 15.

In the example illustrated in FIG. 8, the malware 31a executed in the terminal device 1 determines whether or not the environment in which the malware 31a is executed is on any program in order to determine whether or not the present environment in which the malware 31a is executed is the environment in which the malware 31a is to continue the operation (environment in which the malware 31a is to carry out malignant operation).

In the example illustrated in FIG. 8, the malware 31a transmits an inquiry about whether or not the environment in which the malware 31a is executed is on a program to the virtual OS 11c. Here, the malware 31a in the example of FIG. 8 is executed not on a program such as a debugger but on the virtual OS 11c directly, differently from the case described with FIG. 7. Thus, the malware 31a receives information indicating that the environment in which the malware 31a is executed is not on a program from the virtual OS 11c. Therefore, in the example illustrated in FIG. 8, the malware 31a determines that the present environment in which the malware 31a is executed is the environment in which the malware 31a is to continue the operation, and starts malignant operation. This allows the malware 31a to infect the terminal device 1 even when being preliminarily executed in the verification device 2.

In contrast, the terminal device 1 causes the malware 31a to erroneously determine that the terminal device 1 is a terminal in which the malware 31a is not to operate, and causes the malware 31a to terminate the operation (keeps the malware 31a from starting malignant operation) in some cases. This allows the terminal device 1 to suppress infection with the malware 31a. In the following, a description will be made about one example of processing in the case of causing the malware 31a to make an erroneous determination.

[One Example of Processing in Case of Causing Malware 31a to Make Erroneous Determination]

Figure 9:
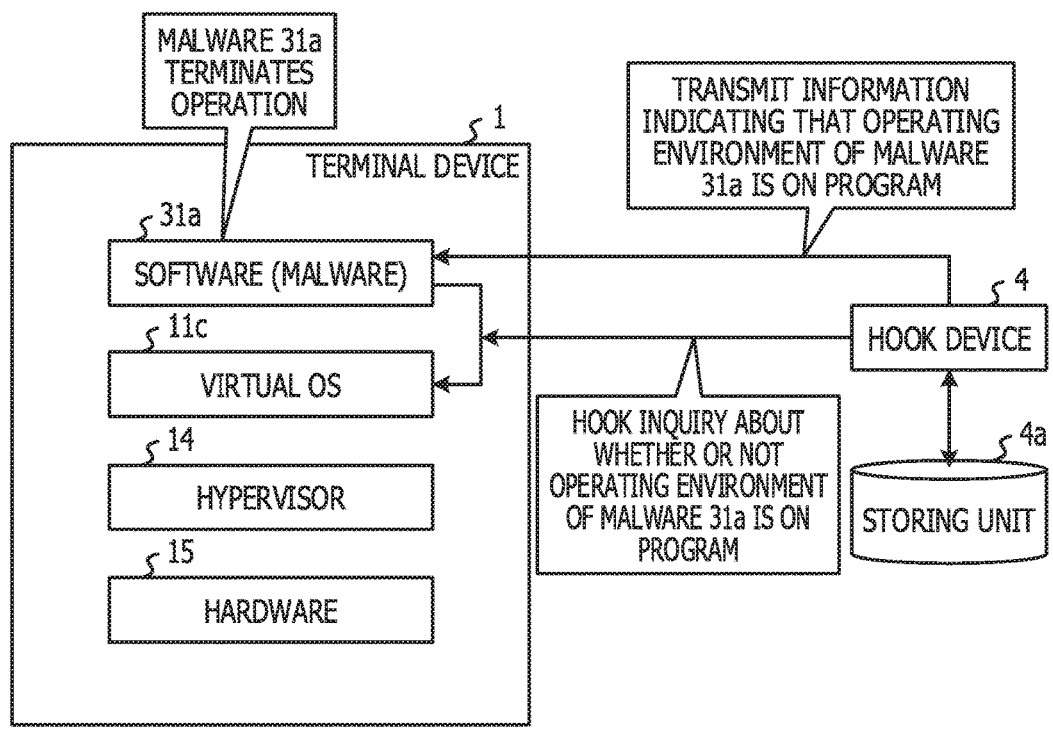
FIGS. 9 and 10 are diagrams for explaining one example of processing in the case of causing malware to make an erroneous determination.
Figure 10:
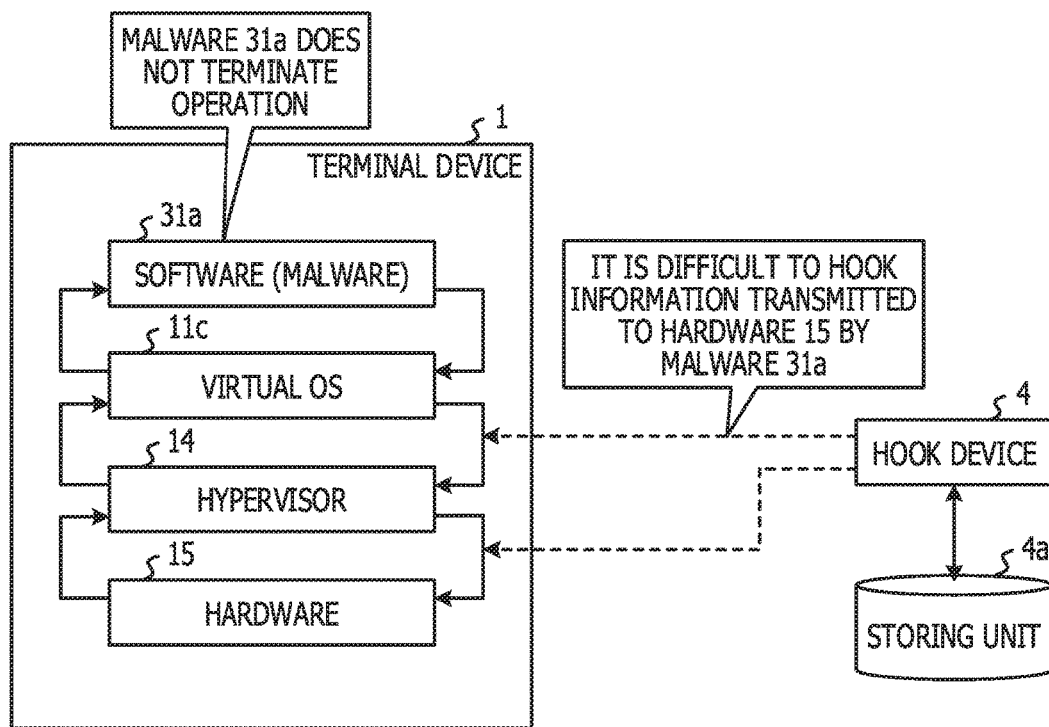

FIGS. 9 and 10 are diagrams for explaining one example of processing in the case of causing malware to make an erroneous determination. The malware illustrated in FIGS. 9 and 10 may be the malware 31a illustrated in FIG. 7. If an inquiry about whether or not the present environment in which the software 31a is executed is on any program is transmitted from the software 31a (having the possibility of being the malware 31a) to the virtual OS 11c, a hook device 4 acquires the transmitted inquiry before the inquiry reaches the virtual OS 11c as illustrated in FIG. 9. Then, if the contents of the acquired inquiry correspond with information stored in a storing unit 4a, the hook device 4 does not transmit the inquiry to the virtual OS 11c. Moreover, in this case, the hook device 4 transmits, to the software 31a, information indicating that the present environment in which the software 31a is executed is on any program (information indicating that malignant operation is not to be started).

That is, the administrator stores, in the storing unit 4a in advance, the respective pieces of information transmitted by various pieces of malware in order to determine whether or not to continue the operation. Then, if information transmitted from the software 31a to the virtual OS 11c is the same information as information stored in the storing unit 4a, the hook device 4 determines that the software 31a that has transmitted the inquiry to the virtual OS 11c is malware (malware 31a). Thereafter, the hook device 4 transmits, to the malware 31a, information indicating that the malware 31a is not to continue the operation as a response to the inquiry transmitted to the virtual OS 11c by the malware 31a.

This allows the hook device 4 to cause the malware 31a to determine that the present environment in which the malware 31a is executed is the environment in which the malware 31a is not to continue the operation and cause the malware 31a to terminate the operation in the terminal device 1 (keep the malware 31a from starting malignant operation). Thus, the hook device 4 can keep the terminal device 1 from becoming infected with the malware 31a.

However, there is a possibility that the malware 31a transmits an inquiry for determining whether or not to continue the operation to the hardware 15 via the virtual OS 11c as illustrated in FIG. 10. For this reason, if the hook device 4 is a device that only hooks information between the software 31a (malware 31a) and the virtual OS 11c, it is difficult to hook information transmitted to the hardware 15 by the malware 31a. Therefore, in this case, it is difficult for the hook device 4 to terminate the operation of the malware 31a in the terminal device 1 and keep the terminal device 1 from becoming infected with the malware 31a.

Thus, in the present embodiment, the hypervisor 14 of the terminal device 1 includes a storing unit that stores commands having the possibility of being transmitted from the malware 31a to the hardware 15 via the virtual OS 11c. Furthermore, the hypervisor 14 of the terminal device 1 hooks a command transmitted from the virtual OS 11c to the hardware 15 (hereinafter, referred to also as first command). Then, if a command having the same contents as the hooked first command is stored in the storing unit, the hypervisor 14 of the terminal device 1 transmits information for causing the malware 31a to determine to terminate the operation to the virtual OS 11c.

That is, the terminal device 1 in the present embodiment hooks the first command transmitted from the virtual OS 11c to the hardware 15 in the hypervisor 14 located between the virtual OS 11c and the hardware 15. This allows the terminal device 1 to hook a command transmitted from the virtual OS 11c to the hardware 15.

Furthermore, in the storing unit (as an entity, part of the hardware 15) of the hypervisor 14 in the present embodiment, commands that were transmitted in the past by the malware 31a in another device (for example, verification device 2) and with which the malware 31a did not start malignant operation as the result of transmission of a response to the command to the malware 31a are stored for example. For this reason, the hypervisor 14 refers to the storing unit of the hypervisor 14 if the malware 31a transmits a first command to the hardware 15 via the virtual OS 11c. Then, if the first command is included in the commands stored in the storing unit of the hypervisor 14, the hypervisor 14 transmits, to the malware 31a, the same information as the information responded to the malware 31a by hardware of another device when the malware 31a transmitted the same command as the first command in this device. This allows the hypervisor 14 to cause the malware 31a to determine that the environment in which the malware 31a is being presently executed (terminal device 1) is the same environment as an environment in which the malware 31a terminated the operation in the past (for example, verification device 2). Thus, the hypervisor 14 can suppress the start of malignant operation by the malware 31a in the terminal device 1.

Moreover, in this case, the administrator is set free from the need to preliminarily acquire all pieces of information having the possibility of being transmitted to the hardware 15 by the malware 31a and store the pieces of information in the storing unit of the hypervisor 14 in advance.

[Hardware Configuration of Terminal Device]

Figure 11:
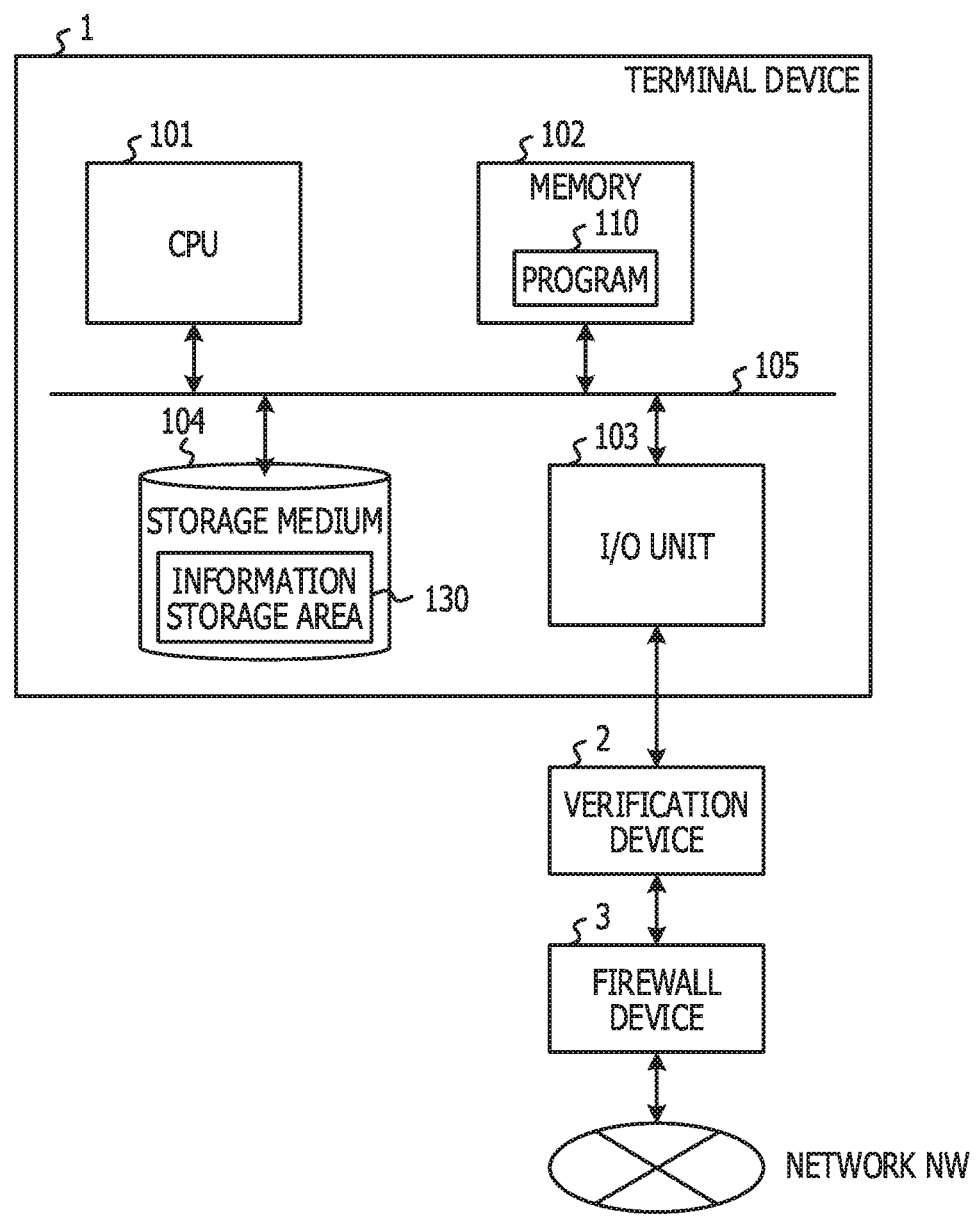
FIG. 11 is a diagram for explaining a hardware configuration of a terminal device.

Next, the hardware configuration of a terminal device will be described. FIG. 11 is a diagram for explaining a hardware configuration of a terminal device. The terminal device illustrated in FIG. 11 may be the terminal device 1 illustrated in FIG. 1.

The terminal device 1 includes a CPU 101 that is a processor, a memory 102, an external interface (input/output (I/O) unit) 103, and a storage medium 104. The respective units are coupled to each other via a bus 105.

The storage medium 104 stores a program 110 for executing processing of protecting the network by causing the operation of the malware 31a to be terminated in the terminal device 1 (hereinafter, referred to also as network protection processing), and so forth, in a program storing area (not illustrated) in the storage medium 104 for example.

As illustrated in FIG. 11, when executing the program 110, the CPU 101 loads the program 110 from the storage medium 104 into the memory 102 and executes the network protection processing and so forth in cooperation with the program 110.

The storage medium 104 includes an information storing area 130 (hereinafter, referred to also as the storing unit 130) that stores information used when the network protection processing and so forth are executed for example. The storing unit 130 functions as the storing unit controlled by the hypervisor 14 for example.

Furthermore, the external interface 103 carries out communications with the verification device 2. In addition, the external interface 103 carries out communications with the network NW via the verification device 2 and the firewall device 3.

[Software Configuration of Terminal Device]

Figure 12:
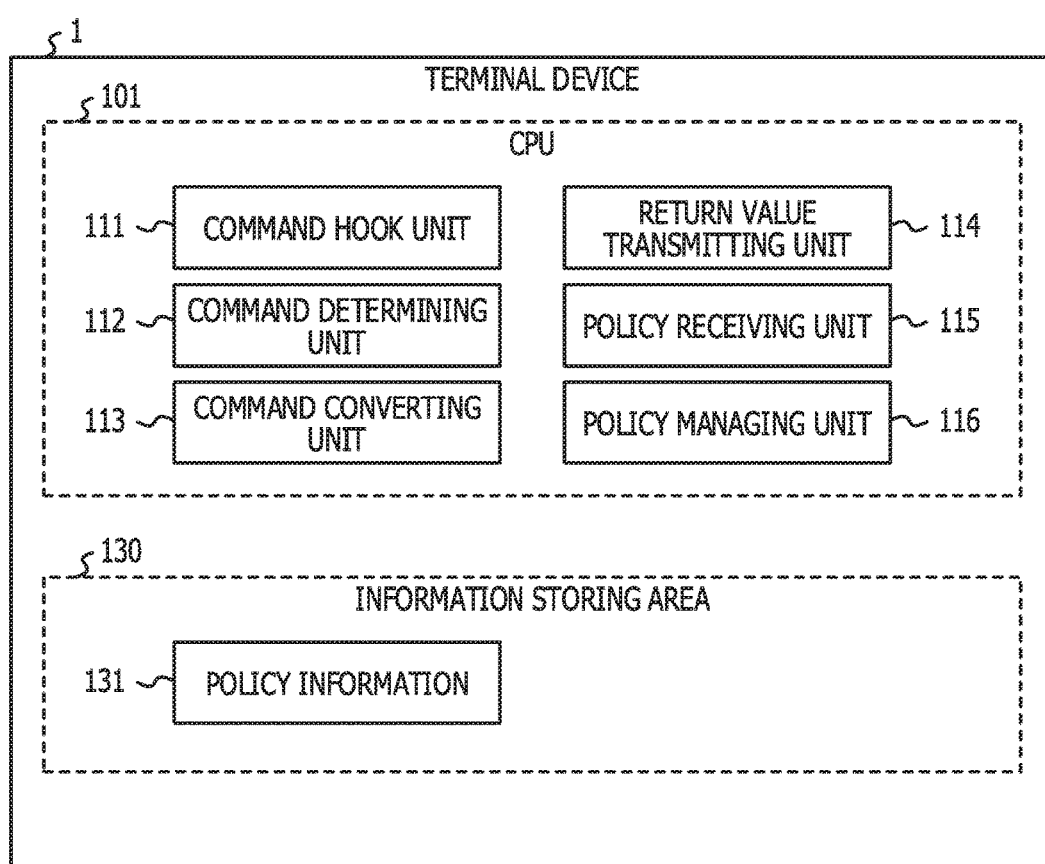
FIG. 12 is a functional block diagram of the terminal device in FIG. 11.

Next, the software configuration of the terminal device 1 will be described. FIG. 12 is a functional block diagram of the terminal device 1 in FIG. 11. By cooperating with the program 110, the CPU 101 functions as a command hook unit 111, a command determining unit 112, a command converting unit 113, a return value transmitting unit 114, a policy receiving unit 115, and a policy managing unit 116 that are functions of the hypervisor 14 of the terminal device 1. Furthermore, policy information 131 is stored in the information storing area 130. Hereinafter, the command hook unit 111, the command determining unit 112, the command converting unit 113, and the return value transmitting unit 114 will be referred to also as a processing unit 120 collectively.

The command hook unit 111 hooks a first command transmitted from the virtual OS 11c of the terminal device 1 to the hardware 15. The command hook unit 111 hooks a first command transmitted to the hardware 15 via the virtual OS 11c by the software 31a (having the possibility of being the malware 31*a*) that operates on the virtual OS 11*c* before the first command is transmitted to the hardware 15.

The command determining unit 112 determines whether or not the first command hooked by the command hook unit 111 is included in a command group (hereinafter, referred to also as the policy information 131) stored in the information storing area 130. Then, the command determining unit 112 determines that the software 31*a* is the malware 31*a* if the first command is included in the policy information 131 stored in the information storing area 130.

Then, if it is determined that the software 31*a* is the malware 31*a*, the command converting unit 113 converts the first command to information for causing the malware 31*a* to determine to terminate the operation (determine not to start malignant operation). That is, the command converting unit 113 creates information for causing the malware 31*a* to terminate the operation (hereinafter, referred to also as return value information 132) if the software 31*a* is the malware 31*a*.

Thereafter, the return value transmitting unit 114 transmits the return value information 132 created by the command converting unit 113 to the software 31*a* via the virtual OS 11*c*.

The policy receiving unit 115 receives the policy information 131 created by the verification device 2. One example when the verification device 2 creates the policy information 131 will be described later. Furthermore, the policy managing unit 116 stores the policy information 131 received by the policy receiving unit 115 in the information storing area 130.

Outline of First Embodiment

Figure 13:
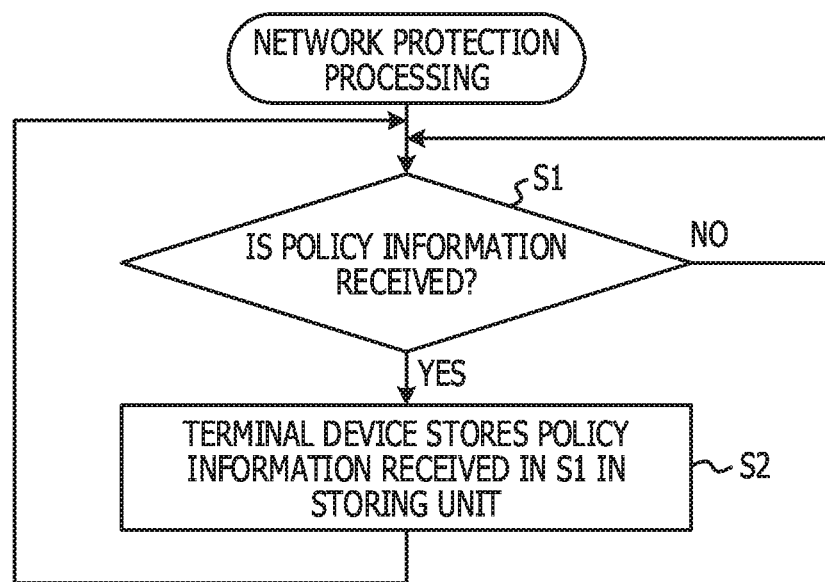
FIGS. 13 and 14 are flowchart diagrams for explaining outline of network protection processing in a first embodiment.
Figure 14:
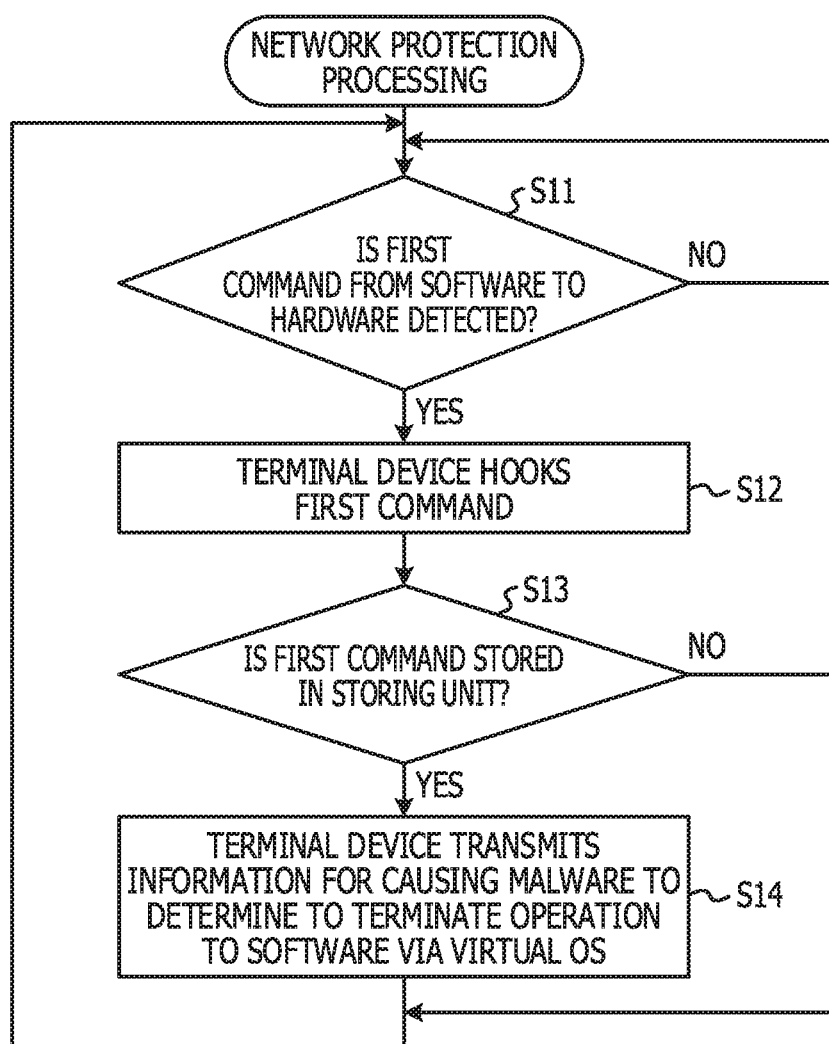
Figure 15:
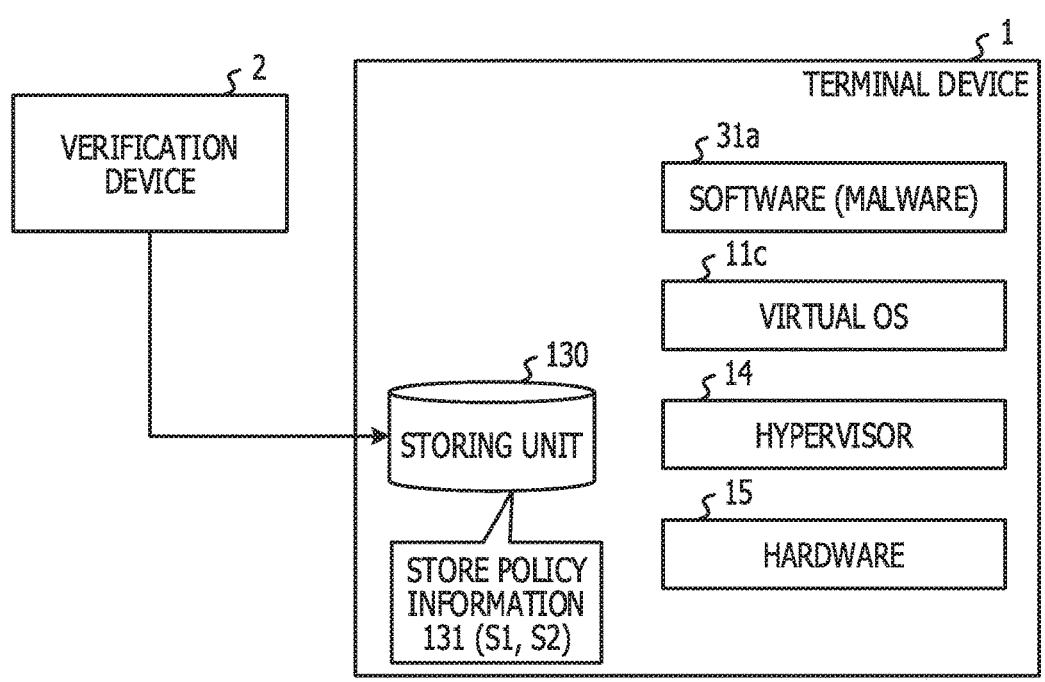
FIGS. 15, 16, and 17 are diagrams for explaining the outline of the network protection processing in the first embodiment.
Figure 16:
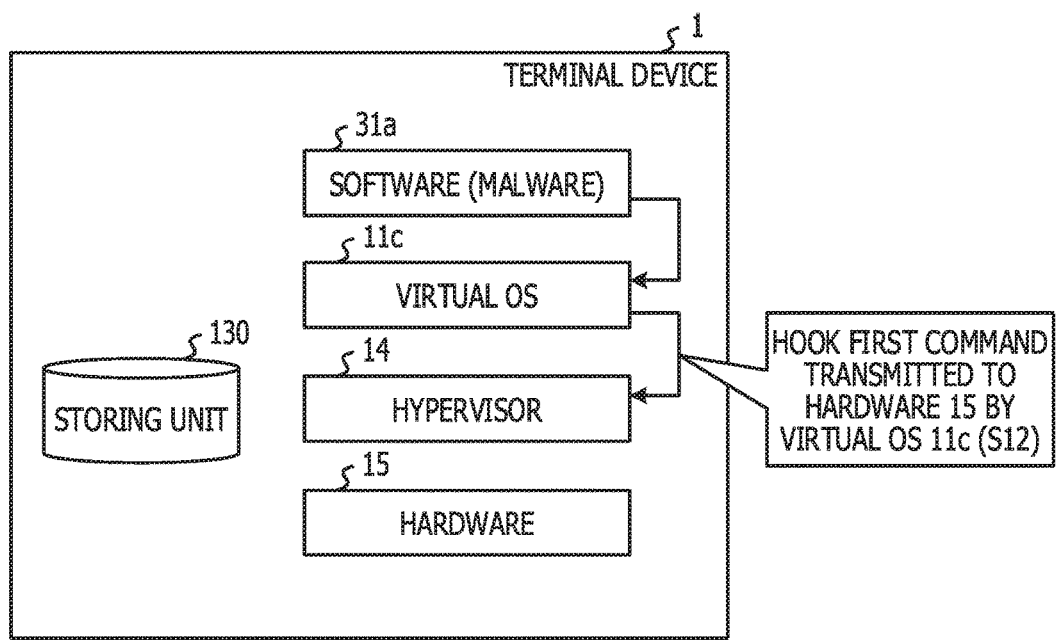
Figure 17:
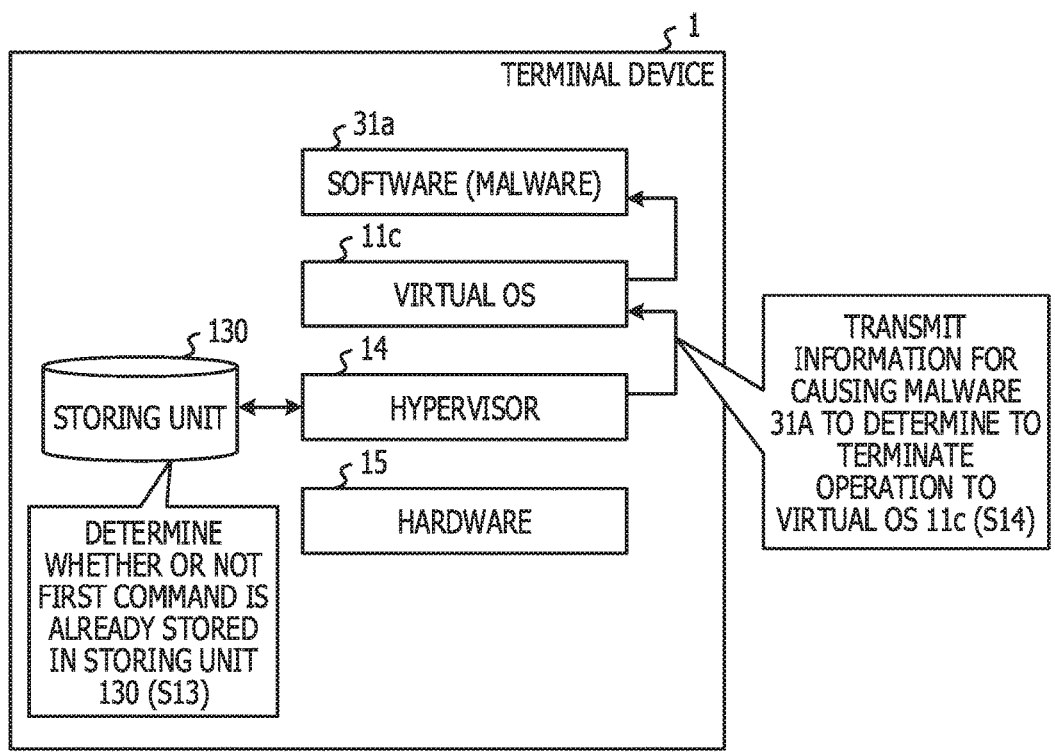

Next, the outline of a first embodiment will be described. FIGS. 13 and 14 are flowchart diagrams for explaining outline of network protection processing in the first embodiment. Furthermore, FIGS. 15, 16, and 17 are diagrams for explaining the outline of the network protection processing in the first embodiment. The outline of the network protection processing of FIGS. 13 and 14 will be described with reference to FIGS. 15 to 17. The following description will be made based on the premise that the terminal device 1 receives the policy information 131 from the verification device 2.

[Processing in Storing Policy Information]

First, processing when the terminal device 1 stores the policy information 131 will be described.

As illustrated in FIG. 13, the terminal device 1 (hypervisor 14) waits until receiving the policy information 131 from the verification device 2 for example (S1; NO). The verification device 2 creates the policy information 131 from information obtained by tallying commands transmitted to the hardware 25 via the virtual OS 21*c* by the software 31*a* (having the possibility of being the malware 31*a*) executed on the virtual OS 21*c* for example. That is, in the policy information 131, information on commands that were transmitted in the past to the hardware 25 by the software 31*a* in the verification device 2 and with which malignant operation by malware was not carried out as the result of transmission of a response to the command to the software 31*a* is included.

In the policy information 131, information actually transmitted to the software 31*a* by the hardware 25 (return value information 132) in response to information transmitted from the software 31*a* may be included.

Then, if receiving the policy information 131 (S1; YES), the terminal device 1 (hypervisor 14) stores the policy information 131 received in the processing of S1 in the information storing area 130 as illustrated in FIG. 15 (S2).

[Processing in Hooking Information]

Next, processing in hooking information transmitted to the hardware 15 by the software 31*a* will be described.

The terminal device 1 (hypervisor 14) waits until detecting transmission of a first command transmitted from the virtual OS 11*c* of the terminal device 1 to the hardware 15 (S11; NO). That is, the terminal device 1 waits until detecting transmission of a first command transmitted to the hardware 15 via the virtual OS 11*c* by the software 31*a* executed on the virtual OS 11*c*. Then, if detecting transmission of a first command (S11; YES), the terminal device 1 (hypervisor 14) hooks the first command as illustrated in FIG. 16 (S12).

Due to this, even when the malware 31*a* transmits a command to the hardware 15 in order to determine whether or not to continue the operation (determine whether or not to start malignant operation), the terminal device 1 can cause the malware 31*a* to determine to terminate the operation as described later.

Furthermore, the terminal device 1 can keep the first command from being transmitted to the hardware 15 as the original transmission destination of the first command. Thus, the terminal device 1 can suppress transmission of a response from the hardware 15 as the original transmission destination of the first command to the software 31*a*.

Thereafter, as illustrated in FIG. 17, the terminal device 1 (hypervisor 14) determines whether or not the first command hooked in the processing of S12 is stored in the information storing area 130 (S13). That is, the terminal device 1 determines that the software 31*a* is the malware 31*a* if the first command is stored in the information storing area 130.

Then, if the first command is stored in the information storing area 130 (S13; YES), the terminal device 1 (hypervisor 14) transmits information for causing the software 31*a* to determine to terminate the operation when the software 31*a* is the malware 31*a* to the software 31*a* via the virtual OS 11*c* (S14). On the other hand, if the first command is not stored in the information storing area 130 (S13; NO), the terminal device 1 does not execute the processing of S14.

That is, if the software 31*a* is the malware 31*a*, the terminal device 1 transmits, to the malware 31*a*, information for causing the malware 31*a* to determine to terminate the operation (information with which the malware 31*a* determined to terminate the operation in the verification device 2) as the return value information 132. Due to this, in the case in which the software 31*a* is the malware 31*a*, the terminal device 1 can cause the malware 31*a* that has referred to the contents of the return value information 132 to determine that the terminal device 1 as the environment in which the malware 31*a* is executed is an environment in which the malware 31*a* is not to continue the operation (malware 31*a* is not to carry out malignant operation). Thus, the terminal device 1 can cause the malware 31*a* to terminate the operation.

As above, according to the first embodiment, the hypervisor 14 of the terminal device 1 includes the storing unit 130 that stores commands transmitted from the malware 31*a* to the hardware 25 via the virtual OS 21*c* of the verification device 2. Furthermore, the hypervisor 14 of the terminal device 1 hooks the first command transmitted from the virtual OS 11*c* of the terminal device 1 to the hardware 15. Furthermore, the hypervisor 14 of the terminal device 1 includes the processing unit 120 that transmits the return value information 132 for causing the malware 31*a* to determine to terminate the operation to the virtual OS 11*c* if the hooked first command is included in the commands stored in the storing unit 130.

This allows the hypervisor 14 of the terminal device 1 to cause the malware 31a to determine that the malware 31a is being executed in the same environment as an environment in which the malware 31a did not start malignant operation in the past (for example, verification device 2). Thus, the hypervisor 14 of the terminal device 1 can cause the malware 31a to terminate the operation.

Furthermore, the hypervisor 14 of the terminal device 1 causes the operation of the malware 31a executed in the terminal device 1 to be terminated on the basis of the command transmitted by the malware 31a in the verification device 2. Thus, the administrator is set free from the need to preliminarily acquire all pieces of information having the possibility of being transmitted to the hardware 15 by the malware 31a and store the pieces of information in the storing unit 130 in advance.

The hypervisor 14 described with FIGS. 15 to 17 is not a hypervisor that operates on an OS but a hypervisor that operates directly on the hardware 15 (Type 1 hypervisor). In contrast, the hypervisor 14 may be a hypervisor that operates on an OS (host OS: not illustrated) that operates directly on the hardware 15 (Type 2 hypervisor).

Details of First Embodiment

Figure 18:
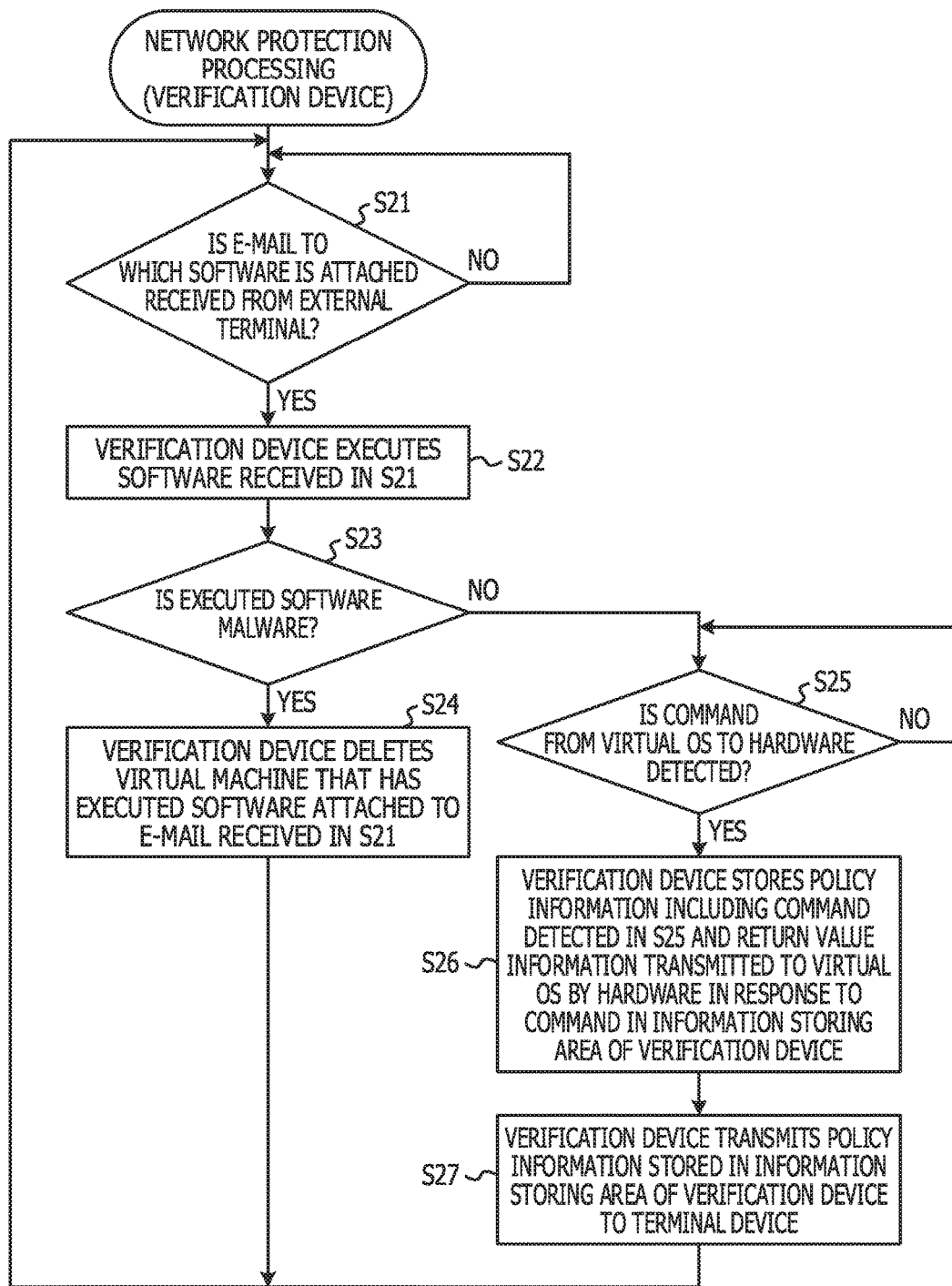
FIGS. 18, 19, and 20 are flowchart diagrams for explaining details of the network protection processing in the first embodiment.
Figure 19:
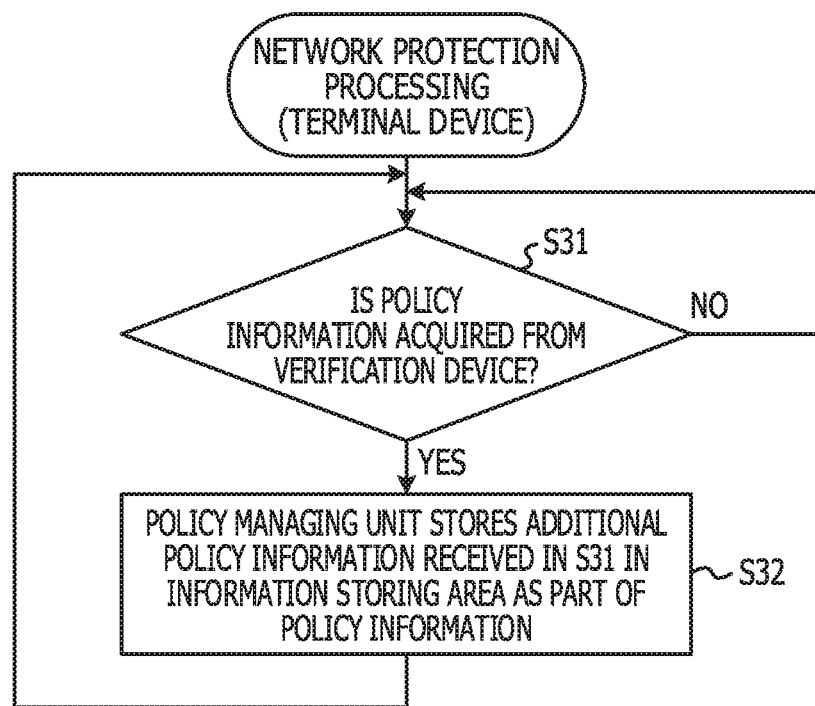
Figure 20:
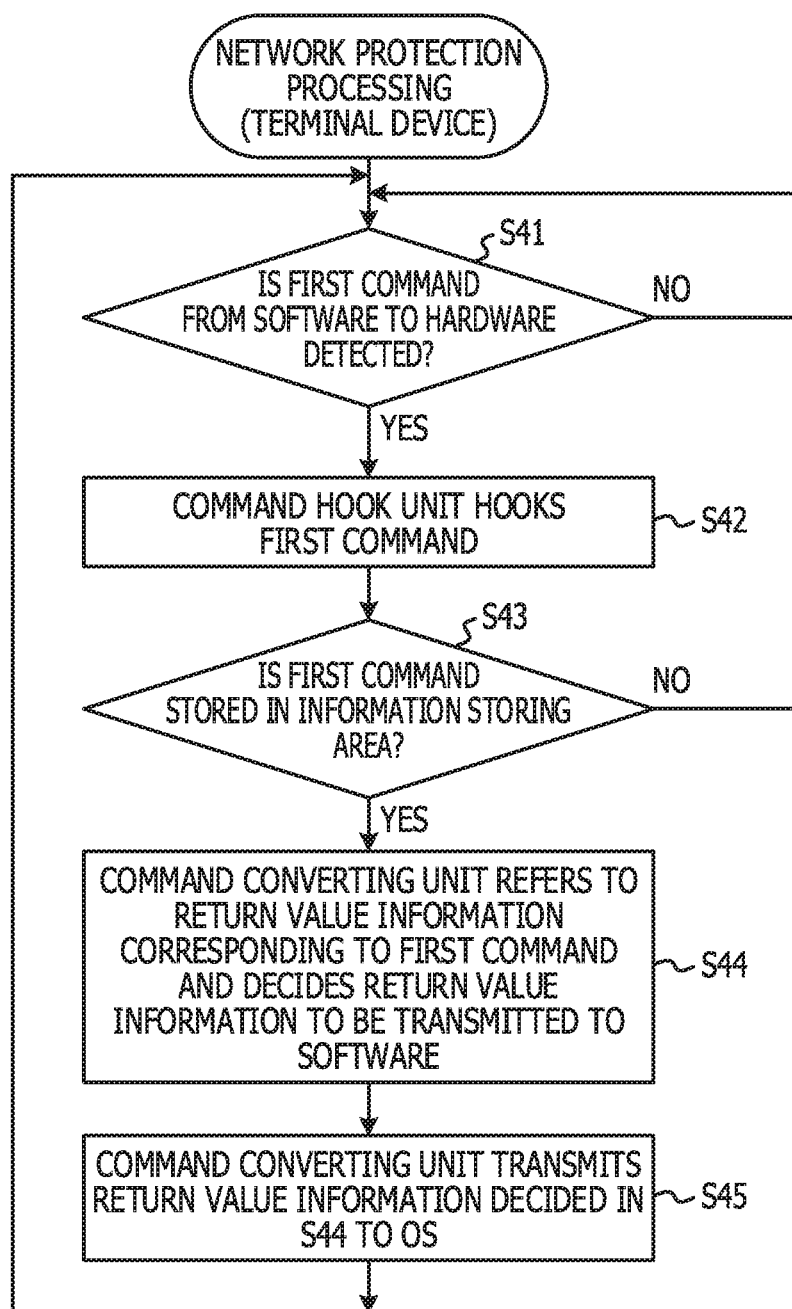

Next, details of the first embodiment will be described. FIGS. 18, 19, and 20 are flowchart diagrams for explaining details of the network protection processing in the first embodiment. Furthermore, FIGS. 21, 22, and 23 are diagrams for explaining details of the network protection processing in the first embodiment. The network protection processing of FIGS. 18 to 20 will be described with reference to FIGS. 21 to 23.

[Network Protection Processing in Verification Device]

First, the network protection processing in the verification device 2 will be described. FIG. 18 is a flowchart diagram for explaining the network protection processing in the verification device 2.

As illustrated in FIG. 18, the verification device 2 waits until receiving an e-mail (e-mail whose destination is the terminal device 1) to which the software 31a is attached from the external terminal 31 (S21; NO). Then, if receiving an e-mail to which the software 31a is attached from the external terminal 31 (S21; YES), the verification device 2 executes the software 31a attached to the received e-mail (S22). The verification device 2 executes the software 31a in a virtual machine (verification environment) generated by the verification device 2 and carries out analysis as described with FIG. 2 and so forth.

Then, if determining that the software 31a attached to the e-mail received in the processing of S21 is the malware 31a (S23; YES), the verification device 2 deletes the virtual machine that has executed the software 31a attached to the received e-mail without transmitting the received e-mail to the terminal device 1 (S24). That is, if the software 31a attached to the e-mail received in the processing of S21 is the malware 31a, the verification device 2 discards the e-mail to which the software 31a is attached without transmitting the e-mail to the terminal device 1 as the destination of the e-mail.

This allows the verification device 2 to keep the terminal device 1 from becoming infected with the malware 31a. Furthermore, the verification device 2 can delete the environment infected with the malware 31a from the verification device 2 by deleting the virtual machine that has executed the malware 31a.

On the other hand, if determining that the software 31a attached to the e-mail received in the processing of S21 is not the malware 31a (S23; NO), the verification device 2 waits until detecting a command transmitted from the virtual OS 21c of the verification device 2 to the hardware 25 (S25; NO). Then, if detecting a command transmitted from the virtual OS 21c to the hardware 25 (S25; YES), the verification device 2 creates information in which the command detected in the processing of S25 is associated with the return value information 132 transmitted to the virtual OS 21c by the hardware 25. Then, the verification device 2 stores the created information as part of the policy information 131 in an information storing area (not illustrated) of the verification device 2 (S26).

That is, there is a possibility that malware that is not determined to be malware by the analysis in the verification device 2 (malware that does not carry out malignant operation in the verification device 2) is included in the software 31a determined not to be the malware 31a in the processing of S23. For this reason, the verification device 2 associates information on the command transmitted to the hardware 25 by the software 31a determined not to be the malware 31a with information transmitted to the software 31a in response to the command (return value information 132) and stores these associated pieces of information as the policy information 131. Then, the verification device 2 transmits the stored policy information 131 to the terminal device 1. This allows the terminal device 1 to suppress malignant operation by the malware 31a in the terminal device 1 as described later.

Thereafter, the verification device 2 detects new information transmitted from the software 31a to the hardware 25 and transmits the policy information 131 to the terminal device 1 (S27). That is, the verification device 2 transmits the policy information 131 to the terminal device 1 every time the policy information 131 stored in the information storing area of the verification device 2 is updated for example. Due to this, when new malware transmits a new command to the hardware 25 in the verification device 2, the terminal device 1 can rapidly respond to the new command. One example of the policy information 131 will be described below.

[One Example of Policy Information]

FIGS. 21, 22, and 23 are one example of policy information. The policy information represented in FIGS. 21, 22, and 23 may be the policy information 131 illustrated in FIG. 12. First, one example of the policy information 131 before the processing of S26 is executed will be described.

FIG. 21 is the one example of the policy information 131 before the processing of S26 is executed. The policy information 131 represented in FIG. 21 includes, as items, "item number" for identification of each piece of information of the policy information 131 and "command" in which the contents of a command transmitted from the software 31a to the hardware 25 are set. Furthermore, the policy information 131 represented in FIG. 21 includes, as an item, "return value" in which the return value information 132 transmitted to the software 31a in response to the command set in "command" is set.

In the policy information 131 represented in FIG. 21, in the information whose "item number" is "1," "reference to hard disk drive (HDD) name" is set as "command" and "VM-AAA-HDD" is set as "return value." Furthermore, in the policy information 131 represented in FIG. 21, in the information whose "item number" is "2," "reference to the number of CPU cores" is set as "command" and "3" is set as "return value." Moreover, in the policy information 131 represented in FIG. 21, in the information whose "item number" is "3," "reference to disc capacity" is set as "command" and "200 (gigabyte (GB))" is set as "return value."

Next, one example of the policy information 131 after the processing of S26 is executed will be described. FIG. 22 is the one example of the policy information 131 after the processing of S26 is executed.

In the policy information 131 represented in FIG. 22, information whose "item number" is "4" (underlined part in FIG. 22) is added, compared with the policy information 131 represented in FIG. 21. In the policy information 131 represented in FIG. 22, in the information whose "item number" is "4," "confirmation of existence of I/O-AAA" is set as "command" and "existence" is set as "return value."

That is, in the policy information 131 represented in FIGS. 21 and 22, the contents of the command transmitted to the hardware 25 by the software 31a in the verification device 2 and the return value information 132 corresponding to the command are set in association with each other. Due to this, when a command to the hardware 15 is transmitted from the software 31a, the terminal device 1 can create information that causes the malware 31a to determine to terminate the operation and transmit the information to the software 31a by referring to the policy information 131.

The policy information 131 may be information having environment information of the verification device 2. Furthermore, when a command to the hardware 15 is transmitted from the software 31a, the terminal device 1 may refer to the policy information 131 including the environment information and the terminal device 1 may create the return value information 132 and transmit the return value information 132 to the software 31a. One example of the policy information 131 having environment information of the verification device 2 will be described below.

[One Example of Policy Information Having Environment Information of Verification Device]

FIG. 23 is the one example of the policy information 131 having environment information of the verification device 2. The policy information 131 represented in FIG. 23 includes, as items, "item number" for identification of each piece of information of the policy information 131, "environment information" in which the item of the environment information of the verification device 2 is set, and "contents" in which the contents of the environment information of the verification device 2 are set.

In the policy information 131 represented in FIG. 23, in the information whose "item number" is "1," "HDD name" is set as "environment information" and "VM-AAA-HDD" is set as "contents." Furthermore, in the policy information 131 represented in FIG. 23, in the information whose "item number" is "2," "the number of CPU cores" is set as "environment information" and "3" is set as "contents." In addition, in the policy information 131 represented in FIG. 23, in the information whose "item number" is "3," "disc capacity" is set as "environment information" and "200 (GB)" is set as "contents." Moreover, in the policy information 131 represented in FIG. 23, in the information whose "item number" is "4," "I/O port" is set as "environment information" and "I/o-AAA, I/O-BBB" as I/O ports possessed by the virtual machine of the verification device 2 is set as "contents."

That is, for example, if detecting transmission of a command to refer to the HDD name from the software 31a, the terminal device 1 refers to the policy information 131 represented in FIG. 23 and acquires "VM-AAA-HDD" as "contents" of the information whose "environment information" is "HDD name." Then, the terminal device 1 transmits "VM-AAA-HDD," which is the HDD name, to the software 31a as the return value information 132.

Furthermore, the terminal device 1 refers to the policy information 131 represented in FIG. 23 if detecting transmission of a command to determine whether or not I/O-BBB exists as an I/O port possessed by the virtual machine of the terminal device 1 that executes the software 31a. Then, the terminal device 1 determines that "I/O-BBB" is set in "contents" of the information whose "environment information" is "I/O port." Thus, in this case, the terminal device 1 transmits the return value information 132 indicating that "I/O-BBB" exists as an I/O port to the software 31a.

On the other hand, if detecting transmission of a command to determine whether or not I/O-CCC exists as an I/O port possessed by the virtual machine of the terminal device 1 that executes the software 31a, the terminal device 1 refers to the policy information 131 represented in FIG. 23 similarly to the above-described case. Then, the terminal device 1 determines that "I/O-CCC" is not set in "contents" of the information whose "environment information" is "I/O port." Thus, in this case, the terminal device 1 transmits the return value information 132 indicating that "I/O-CCC" does not exist as an I/O port to the software 31a.

[Network Protection Processing in Terminal Device]

Next, the network protection processing in the terminal device 1 will be described. FIGS. 19 and 20 are flowchart diagrams for explaining the network protection processing in the terminal device 1.

As illustrated in FIG. 19, the policy receiving unit 115 of the terminal device 1 waits until receiving the policy information 131 from the verification device 2 for example (S31; NO). Then, if receiving the policy information 131 (S31; YES), the policy managing unit 116 of the terminal device 1 stores the policy information 131 received in the processing of S31 in the information storing area 130 (S32). The verification device 2 may transmit only updated information in pieces of the policy information 131 (information that has not been transmitted to the policy receiving unit 115 in pieces of the policy information 131) to the policy receiving unit 115.

Furthermore, as illustrated in FIG. 20, the command hook unit 111 of the terminal device 1 waits until detecting transmission of a first command transmitted from the software 31a of the terminal device 1 to the hardware 15 via the virtual OS 11c (S41; NO). Then, if detecting transmission of a first command (S41; YES), the command hook unit 111 hooks the first command (S42).

Thereafter, the command determining unit 112 of the terminal device 1 determines whether or not the first command hooked in the processing of S42 is included in the policy information 131 stored in the information storing area 130 (S43). Then, if the first command is included in the policy information 131 (S43; YES), the command converting unit 113 of the terminal device 1 refers to the policy information 131 stored in the information storing area 130 and carries out conversion of the first command. That is, the command converting unit 113 decides the return value information 132 to be transmitted to the software 31a (S44). Thereafter, the return value transmitting unit 114 transmits the return value information 132 decided in the processing of S44 to the software 31a (S45).

If the contents of the first command hooked by the command hook unit 111 are "reference to disc capacity," the command determining unit 112 refers to the policy information 131 described with FIG. 22 for example. Then, the command determining unit 112 determines that information whose "command" is "reference to disc capacity" (information whose "item number" is "3") exists in the policy information 131 described with FIG. 22. Thus, the command converting unit 113 acquires "200 (GB)," which is the information set in "return value" (return value information 132) of the information whose "item number" is "3." Then, the return value transmitting unit 114 transmits "200 (GB)" as the return value information 132 acquired by the command converting unit 113 to the software 31a via the virtual OS 11c.

On the other hand, if the first command is not included in the policy information 131 (S43; NO), the command converting unit 113 does not execute the processing of S44 and S45.

That is, the command hook unit 111 waits until the software 31a transmitted from the verification device 2 (software 31a that has passed through the verification device 2) transmits, to the hardware 15 of the terminal device 1, the same command (first command) as the command transmitted to the hardware 25 in the verification device 2. Then, if the first command is transmitted from the software 31a to the hardware 15, the return value information 132 having the same contents as the information transmitted by the hardware 25 in the verification device 2 is transmitted to the software 31a.

This allows the terminal device 1 to cause the malware 31a to determine that the malware 31a is being executed in the same environment as an environment in which the malware 31a terminated the operation in the past (environment in which the malware 31a did not start malignant operation in the past). Thus, the terminal device 1 can cause the operation of the malware 31a in the terminal device 1 to be terminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
   a verification device configured to
     receive software,
     execute the software received, and
     transmit to the software, when a first command is generated by the software, information which causes the software to terminate an operation of the software in the verification device; and
   a terminal device configured to
     receive, from the verification device, the information and a notification regarding the first command,
     receive, from the verification device, the software;
     hook a second command when the second command is generated by the software, and
     transmit, to the software, the information that is transmitted from the verification device and causes the software to terminate the operation of the software in the terminal device when the second command corresponds with the first command.

2. The system according to claim 1, wherein the first command is transmitted from an operating system of the verification device to hardware of the verification device when the software is executed in the verification device.

3. The system according to claim 2, wherein the information is transmitted to the operating system of the verification device by the hardware of the verification device in response to the first command transmitted to the hardware of the verification device by the operating system of the verification device.

4. The system according to claim 3, wherein the information indicates that an operating system of the terminal device is a virtual operating system and is the same operating system as the operating system of the verification device.

5. The system according to claim 1, wherein the terminal device is configured to transmit the information to the operating system of the terminal device without transmitting the second command to the hardware of the terminal device when the second command corresponds with the first command.

6. The system according to claim 1, wherein the terminal device is configured to transmit the second command to the hardware of the terminal device when the second command does not correspond with the first command.

7. A method executed by a verification device and a terminal device, the method comprising:
   receiving software by the verification device;
   executing the software by the verification device; and
   transmitting to the software, by the verification device when a first command is generated by the software, information which causes the software to terminate an operation of the software in the verification device;
   receiving, by the terminal device from the verification device, the information and a notification regarding the first command;
   receiving, by the terminal device, from the verification device, the software;
   hooking, by the terminal device when a second command is generated by the software, a second command; and
   transmitting, by the terminal device to the software, the information that is transmitted from the verification device and causes the software to terminate the operation of the software in the terminal device when the second command corresponds with the first command.

8. The method according to claim 7, wherein the first command is transmitted from an operating system of the verification device to hardware of the verification device when the software transmitted toward the terminal device is executed in the verification device.

9. The method according to claim 8, wherein the information is transmitted to the operating system of the verification device by the hardware of the verification device in response to the first command transmitted to the hardware of the verification device by the operating system of the verification device.

10. The method according to claim 9, wherein the information indicates that an operating system of the terminal device is a virtual operating system and is the same operating system as the operating system of the verification device.

11. The method according to claim 7, wherein the transmitting transmits the information to the operating system of the terminal device without transmitting the second command to the hardware of the terminal device when the second command corresponds with the first command.

12. The method according to claim 7, further comprising: transmitting the second command to the hardware of the terminal when the second command does not correspond with the first command.

13. A non-transitory storage medium storing a program for causing a system including a verification device and a terminal device to execute a process, the process comprising:
   receiving, by the verification device, a software;
   executing, by the verification device, the received software; and
   transmitting to the software, by the verification device when a first command is generated by the software, information which causes the software to terminate an operation of the software in the verification device;
   receiving, by the terminal device, from the verification device, the information and a notification regarding the first command;
   receiving, by the terminal device, from the verification device, the software;
   hooking, by the terminal device when a second command is generated by the software, the second command; and
   transmitting, by the terminal device to the software, the information that is transmitted from the verification device and causes the software to terminate the operation of the software in the terminal device when the second command corresponds with the first command.

14. The non-transitory storage medium according to claim 13,
   wherein the first command is a command transmitted from an operating system of the verification device to hardware of the verification device when the software transmitted toward the terminal device is executed in the verification device.

15. The non-transitory storage medium according to claim 14, wherein the information is transmitted to the operating system of the verification device by the hardware of the verification device in response to the first command transmitted to the hardware of the verification device by the operating system of the verification device.

16. The non-transitory storage medium according to claim 13, wherein the transmitting transmits the information to the operating system of the terminal device without transmitting the second command to the hardware of the terminal device when the second command corresponds with the first command.

17. The non-transitory storage medium according to claim 13, the process further comprising: transmitting the second command to the hardware of the terminal device when the second command does not correspond with the first command.

18. A system comprising:
   a verification device configured to
      receive a software,
      execute the received software, and
      transmit to the software, when a first command is generated by the software, information indicating a condition on which the software is executed; and
   a terminal device configured to
      receive, from the verification device, the information and a notification regarding the first command,
      receive, from the verification device, the software;
      hook the second command, when a second command is generated by the software, and
      transmit, to the software, the information that is transmitted from the verification device when the second command corresponds with the first command.

19. The system according to claim 18, wherein the condition is a virtual environment for analyzing the software.

20. The system according to claim 19, wherein the virtual environment is a debugger.

* * * * *